(12) United States Patent
Cheng et al.

(10) Patent No.: US 11,370,353 B2
(45) Date of Patent: Jun. 28, 2022

(54) WIRELESS DOORSILL PLATE WITH CHANGEABLE DISPLAY INFORMATION AND POWER-SAVING MECHANISM

(71) Applicants: Chia-Pao Cheng, Hsinchu (TW); Pao-Lin Guo, Hsinchu (TW); An-Tsun Teng, Hsinchu (TW)

(72) Inventors: Chia-Pao Cheng, Hsinchu (TW); Pao-Lin Guo, Hsinchu (TW); An-Tsun Teng, Hsinchu (TW)

(73) Assignee: ZEALIO ELECTRONICS CO., LTD., Hsinchu (TW)

( * ) Notice: Subject to any disclaimer, the term of this patent is extended or adjusted under 35 U.S.C. 154(b) by 0 days.

(21) Appl. No.: 16/788,110

(22) Filed: Feb. 11, 2020

(65) Prior Publication Data
US 2021/0248968 A1 Aug. 12, 2021

(51) Int. Cl.
*B60Q 1/32* (2006.01)
*G09G 3/34* (2006.01)
(Continued)

(52) U.S. Cl.
CPC .............. *B60Q 1/323* (2013.01); *B60K 35/00* (2013.01); *B60Q 3/217* (2017.02);
(Continued)

(58) Field of Classification Search
CPC ...... G09G 3/3208; G09G 3/18; G09G 3/3413; G09G 2330/023; G09G 3/3406;
(Continued)

(56) References Cited

U.S. PATENT DOCUMENTS 10,592,916 B1 * 3/2020 DeLorean .............. G08G 1/052
2001/0041543 A1 * 11/2001 Lim ..................... H04M 1/0245
455/550.1
(Continued)

OTHER PUBLICATIONS

Corning. "A Day Made of Glass 2". https://youtu.be/jZkHpNnXLB0 (Year: 2012).*
(Continued)

*Primary Examiner* — Julie Anne Watko
(74) *Attorney, Agent, or Firm* — Che-Yang Chen; Law Office of Michael Chen

(57) ABSTRACT

A wireless doorsill plate with changeable display information and power-saving mechanism includes a baseplate, a battery module, a radio frequency module, a display module and an energy-saving module. A circuit board is provided on the baseplate, the battery module is disposed on the baseplate and electrically connected to the circuit board, and the battery module is used to generate an electric power. The radio frequency module is disposed on the circuit board and used to receive an activation signal to generate a wireless signal. The display module is assembled on the circuit board and has a backlight unit connected to the battery module. The energy-saving module is disposed on the circuit board and electrically connected to the battery module. According to the wireless signal the energy-saving module reduces the electric power generated by the battery module in order to turn on the backlight unit.

8 Claims, 3 Drawing Sheets

(51) Int. Cl.
*G06F 1/3218* (2019.01)
*G06F 1/3209* (2019.01)
*B60Q 3/217* (2017.01)
*B60R 13/04* (2006.01)
*B60R 13/02* (2006.01)
*B60K 35/00* (2006.01)

(52) U.S. Cl.
CPC .......... *B60R 13/0243* (2013.01); *B60R 13/04* (2013.01); *G06F 1/3209* (2013.01); *G06F 1/3218* (2013.01); *G09G 3/3406* (2013.01); *G09G 3/3413* (2013.01); *B60K 2370/794* (2019.05); *G09G 2330/023* (2013.01)

(58) Field of Classification Search
CPC .. G09G 3/34; G09G 3/22; G09G 3/30; G09G 3/2003; G09G 3/20; G09G 3/00; G09G 3/16; G09G 3/12; G09G 2330/02; G09G 2330/00; G06F 1/3209; G06F 1/3206; G06F 1/3218; G06F 1/3215; G06F 1/3212; G06F 1/3203; G06F 1/32; G06F 1/26; G06F 1/00; B60R 13/0243; B60R 13/0256; B60R 13/0237; B60R 13/02; B60R 13/005; B60R 13/00; B60R 13/04; B60Q 1/323; B60Q 3/217; B60K 35/00; B60K 2370/794
USPC ........................................................ 345/213
See application file for complete search history.

(56) References Cited

U.S. PATENT DOCUMENTS

| | | | |
|---|---|---|---|
| 2011/0221589 A1* | 9/2011 | LeBeau | B60Q 3/217 340/468 |
| 2016/0132281 A1* | 5/2016 | Yamazaki | G06F 3/044 345/1.3 |
| 2016/0224302 A1* | 8/2016 | Imana | G06F 1/3265 |
| 2017/0174122 A1* | 6/2017 | Cheng | B60Q 1/323 |

OTHER PUBLICATIONS

ModernBob. https://social.technet.microsoft.com/Forums/windowsserver/en-US/4ad06e11-2ac1-4480-ace8-833a0b1cbe98/windows-7-sleep-timeout-not-working-as-expected?forum=w7itprogeneral (Apr. 2010). (Year: 2010).*

* cited by examiner

WIRELESS DOORSILL PLATE WITH CHANGEABLE DISPLAY INFORMATION AND POWER-SAVING MECHANISM

BACKGROUND OF THE INVENTION

Field of Invention

The present invention relates to a wireless doorsill plate with changeable display information, and more particularly to a wireless doorsill plate with changeable display information and power-saving mechanism capable of stably outputting electric power and achieving power-saving effect.

Related Art

Cars have been widely used as a means of transportation in modern society, and light-emitting devices are used in vehicles, in addition to being used for decorative effects, but also to provide daytime and nighttime warning and lighting effects, and thus many people will additionally install light-emitting devices such as warning light and doorsill plate in the car. Especially in recent years, because the drivers of the front cars opened the door improperly without noticing the rear approaching cars and pedestrians, resulting in crash accidents and have become major traffic accidents. Especially when the light is dim at night, the light-emitting device at the door of the car is even more important. Some drivers in Taiwan install reflective stickers or reflective anti-collision strips on an inner side of the car door to remind the rear approaching pedestrians and cars, but the effects are poor. As a result, many manufacturers introduce car warning lights and doorsill plates as other means to remind pedestrians and vehicles coming from behind.

At present, in order to reduce the thickness of the doorsill plates on the market, button cell batteries must be used to reduce the size of the doorsill plates and operate the doorsill plates at the same time. However, when the wireless module, display module and light-emitting module of the doorsill plate are activated at the same time, the electric power required is far greater than the load that the button cell batteries can withstand, which causes the activation of the doorsill plate to be abnormal or even the doorsill plate is unable to start.

In addition, the texts or graphics displayed on the doorsill plate are usually printed or hollowed out by laser cutting at the factory. Therefore, for users, because the text or graphics cannot be modified after purchase, the doorsill plate may not meet the requirements of users. For manufacturers, different brands have different logos, and thus the same production mold cannot be used for the different logos, resulting in manufacturing costs that cannot be reduced.

Therefore, how to solve the above problems and drawbacks in the prior art is what the inventor of the present invention and relevant manufacturers engaged in this industry are eager to research and make improvement.

SUMMARY OF THE INVENTION

Therefore, in order to effectively solve the above problems, a main object of the present invention is to provide a wireless doorsill plate with changeable display information and power-saving mechanism capable of stably outputting an electric power.

A secondary object of the present invention is to provide a wireless doorsill plate with changeable display information and power-saving mechanism capable of enabling the normal use of a battery module.

Another secondary object of the present invention is to provide a wireless doorsill plate with changeable display information and power-saving mechanism capable of achieving power-saving efficacy.

In order to achieve the above objects, the present invention provides a wireless doorsill plate with changeable display information and power-saving mechanism including a baseplate, a battery module, a radio frequency module, a display module and an energy-saving module. A circuit board is provided on the baseplate, the battery module is disposed on the baseplate and electrically connected to the circuit board, and the battery module is used to generate an electric power. The radio frequency module is disposed on the circuit board and used to receive an activation signal to generate a wireless signal. The display module is assembled on the circuit board and has a backlight unit connected to the battery module. The energy-saving module is disposed on the circuit board and electrically connected to the battery module. According to the wireless signal the energy-saving module reduces the electric power generated by the battery module in order to turn on the backlight unit.

With the above structural design of the present invention, and through the energy-saving module disposing on the circuit board, after the activation signal is generated by activating the wireless doorsill plate with changeable display information by an activation unit, the radio frequency module receives the activation signal and is turned on to operate and generate the wireless signal, and then the energy-saving module receives the wireless signal and reduces the electric power generated by the battery module according to the wireless signal in order to turn on the backlight unit of the display module, thereby achieving stable output of electric power and enabling the normal use of the battery module, and an overall electrical load is controlled below 20 mA under any circumstances to achieve power-saving efficacy.

DETAILED DESCRIPTION OF THE INVENTION

Figure 1:
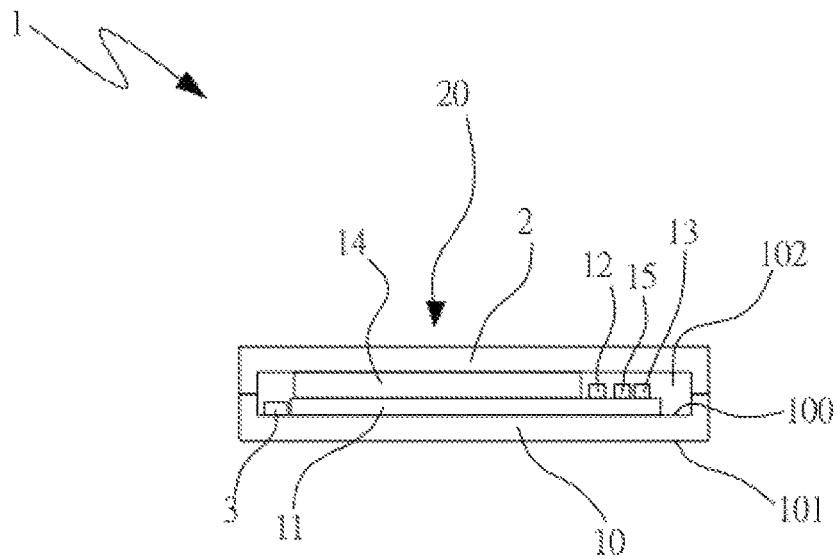
FIG. 1 is a schematic structural diagram of a first embodiment of a wireless doorsill plate with changeable display information and power-saving mechanism.

The above objects of the present invention, as well as its structural and functional features, will be described in accordance with the preferred embodiments of the drawings.

The present invention mainly provides a wireless doorsill plate with changeable display information and power-saving mechanism. Through a new structural configuration, an electric power can be stably output, a battery can be used normally, and power-saving efficacy can be achieved. In the following, embodiments of the present invention will be described in detail, and illustrated in conjunction with the drawings. In addition to the detailed descriptions, the present invention can also be widely implemented in other embodiments, any replacement, modification, and equivalent changes that can be made easily to the described embodiments are included in the scope of the present invention, and the scope of the subsequent claims shall prevail. In the descriptions of the specification, in order to provide the readers a more complete understanding of the present invention, many specific details are provided; however, the present invention can still be implemented with some or all of these specific details being omitted. In addition, well-known steps or elements have not been described in the details to avoid unnecessary limitations to the present invention. The same or similar elements in the drawings will be represented by the same or similar numerals. It is particularly noted that the drawings are for illustration purpose only, and do not represent the actual sizes or quantities of the elements, and irrelevant details have not been fully drawn in order to simplify the drawings.

Figure 2:
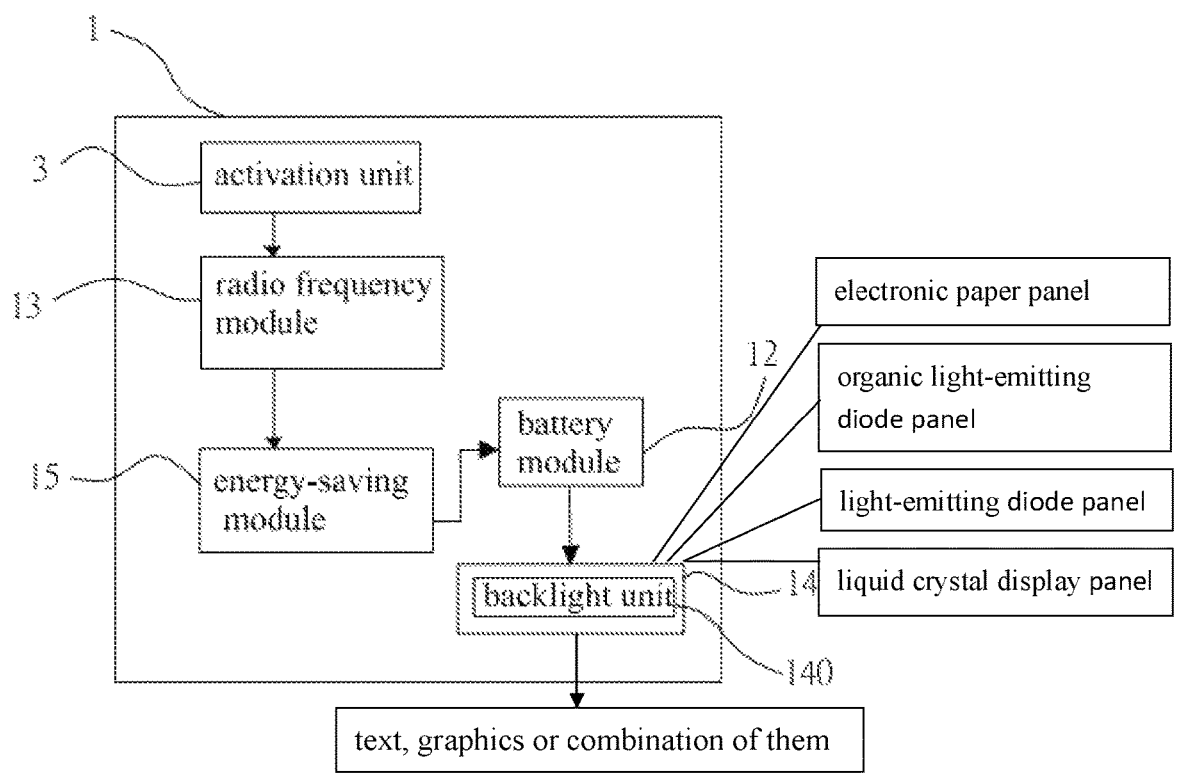
FIG. 2 is a block diagram of the first embodiment of the wireless doorsill plate with changeable display information and power-saving mechanism.

Please refer to FIGS. 1 and 2 respectively for schematic structural diagram and block diagram of a first embodiment of a wireless doorsill plate with changeable display information and power-saving mechanism. As shown in the drawings, a wireless doorsill plate with changeable display information and power-saving mechanism 1 includes a baseplate 10, a battery module 12, a radio frequency module 13, a display module 14, and an energy-saving module 15, and the detailed structures are described hereunder.

The baseplate 10 has an upper surface 100 and a lower surface 101 opposite to each other, wherein a circuit board 11 is disposed on the upper surface 100 of the baseplate 10. In one embodiment, the baseplate 10 has a groove 102, and the circuit board 11 is disposed in the groove 102 to reduce an overall thickness. Furthermore, in one embodiment, the circuit board 11 can be the thin-film circuit board 11 to achieve thinning efficacy.

The battery module 12 is disposed on the upper surface 100 of the baseplate 10 and electrically connected to the circuit board 11. The battery module 12 is used to generate an electric power to provide power required for the wireless doorsill plate with changeable display information 1. In this embodiment, the battery module 12 is a button cell battery to achieve the thin wireless doorsill plate with changeable display information 1, and the radio frequency module 13, the display module 14, and the energy-saving module 15 are respectively disposed on the circuit board 11.

The radio frequency module 13 is used to receive an activation signal and generate a wireless signal. The display module 14 has a backlight unit 140 electrically connected to the battery module 12, wherein the energy-saving module 15 is electrically connected to the battery module 12, and the energy-saving module 15 receives the wireless signal in order to control the electric power generated by the battery module 12 to turn on the backlight unit 140. Therefore, the backlight unit 140 of the display module 14 is not always in a normally-on or normally-off state, and the energy-saving module 15 can intelligently adjust the time for turning on or off the backlight unit 140 according to the wireless signal. In one embodiment, the display module 14 includes, but is not limited to, a light-emitting diode panel, an organic light-emitting diode panel, a liquid crystal display panel, and an electronic paper panel.

In one embodiment, the wireless doorsill plate with changeable display information 1 further includes an upper cover plate 2 disposing on the baseplate 10 to cover at least the battery module 12, the radio frequency module 13, and the energy-saving module 15, wherein the upper cover plate 2 has at least one hollow portion 20 located above the display module 14 to facilitate light emission. In one embodiment, the upper cover plate 2 can be adhered and disposed on a part of the baseplate 10 with a waterproof adhesive to enhance the waterproof effect.

Figure 3:
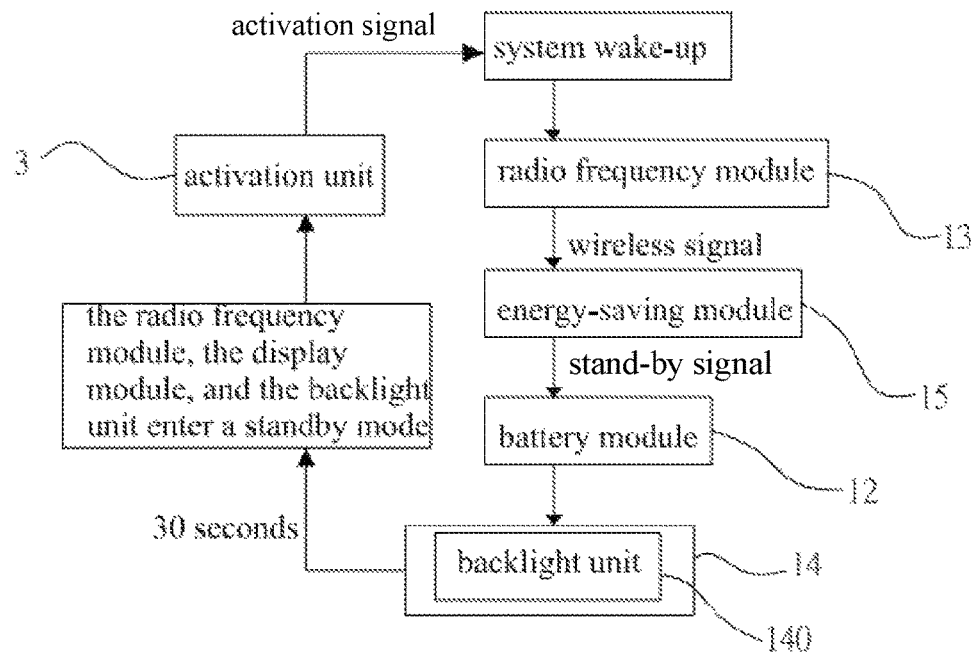
FIG. 3 is a flowchart of the first embodiment of the wireless doorsill plate with changeable display information and power-saving mechanism.

In addition, the wireless doorsill plate with changeable display information 1 is further provided with an activation unit 3, the activation unit 3 is correspondingly disposed on the baseplate 10 to generate the activation signal, and is used as an activation device of the wireless doorsill plate with changeable display information 1. Please refer to FIG. 3 as well, the radio frequency module 13 receives the activation signal generated by the activation unit 3 and is turned on to operate and generate the wireless signal, and then the energy-saving module 15 receives the wireless signal and reduces the electric power generated by the battery module 12 according to the wireless signal in order to turn on the backlight unit 140 of the display module 14. The backlight unit 140 enters a sleep mode and generates a standby signal after being turned on for a period of time. In this embodiment, the backlight unit 140 is set to enter the sleep mode after being turned on for 30 seconds, but the actual implementation is not limited to the aforementioned time period, and the time period is adjusted according to the requirements of users. The radio frequency module 13, the display module 14, and the backlight unit 140 enter a standby mode according to the standby signal, and wait for the next activation of the activation unit 3 to form a system with a power-saving mechanism. In this way, in addition to the wireless doorsill plate with changeable display information 1 capable of achieving stable output of electric power and enabling the normal use of the battery module 12, an overall electrical load is controlled below 20 mA under any circumstances to achieve power-saving efficacy.

Figure 4:
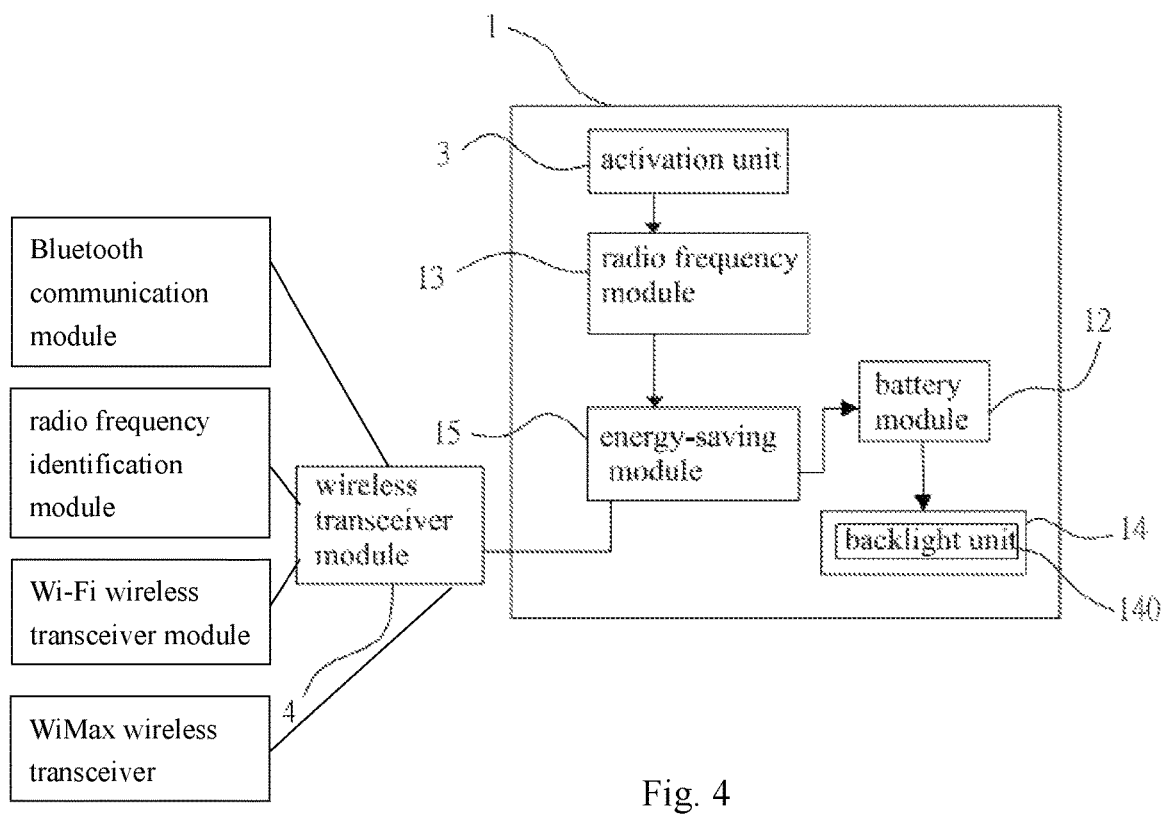
FIG. 4 is a block diagram of a second embodiment of the wireless doorsill plate with changeable display information and power-saving mechanism.
Figure 5:
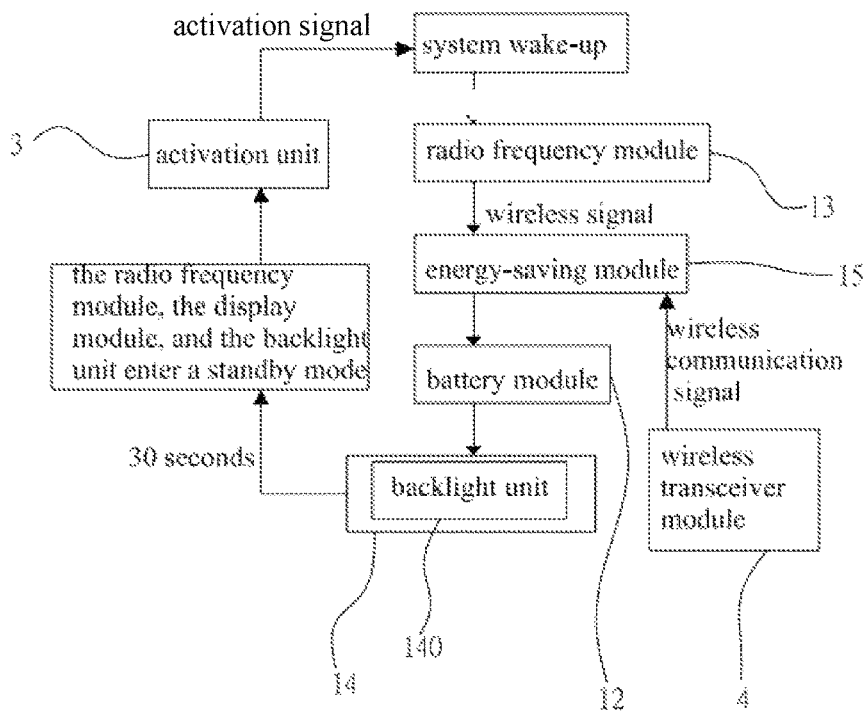
FIG. 5 is a flowchart of the second embodiment of the wireless doorsill plate with changeable display information and power-saving mechanism.

Please refer to FIG. 4 and FIG. 5, which are respectively block diagram and flowchart of a second embodiment of the wireless doorsill plate with changeable display information and power-saving mechanism. The components and the corresponding relationships between the components of this wireless doorsill plate with changeable display information and power-saving mechanism are the same as those of the aforementioned wireless doorsill plate with changeable display information and power-saving mechanism, so they will not be repeated herein.

However, a main difference between this wireless doorsill plate with changeable display information and power-saving mechanism and the aforementioned wireless doorsill plate with changeable display information and power-saving mechanism is that, a wireless transceiver module 4 is further connected to the energy-saving module 15. The energy-saving module 15 receives a wireless communication signal from the wireless transceiver module 4 so that the wireless transceiver module 4 turns on the display module 14 and reduces a brightness of the backlight unit 140 and reduces power consumption at the same time. Therefore, with a change in a brightness of the backlight unit 140, users can confirm that the wireless transceiver module 4 has been successfully connected to the energy-saving module 15. In one embodiment, the wireless transceiver module 4 includes, but is not limited to, a Bluetooth communication module, a radio frequency identification module, a Wi-Fi wireless transceiver module, and a WiMax wireless transceiver module.

Figure 6:
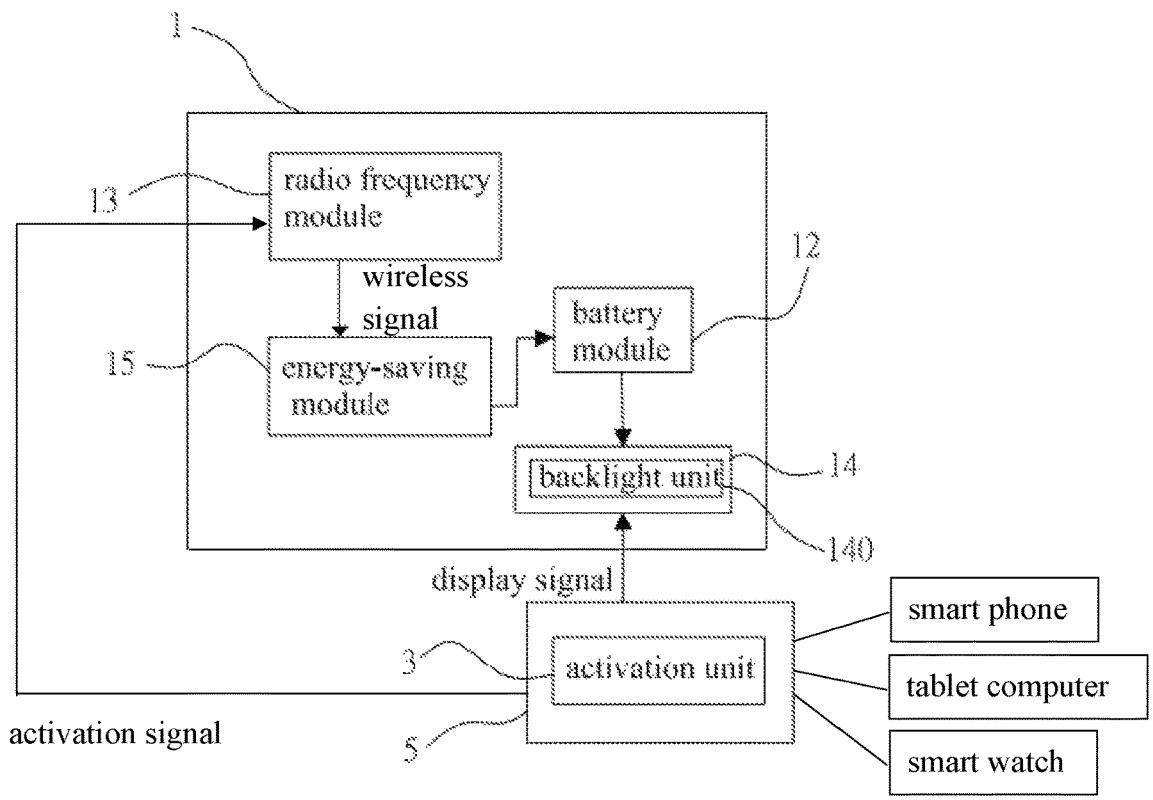
FIG. 6 is a block diagram of a third embodiment of the wireless doorsill plate with changeable display information and power-saving mechanism.

Please refer to FIG. 6, which is a block diagram of a third embodiment of the wireless doorsill plate with changeable display information and power-saving mechanism. The components and the corresponding relationships between the components of this wireless doorsill plate with changeable display information and power-saving mechanism are the same as those of the aforementioned wireless doorsill plate with changeable display information and power-saving mechanism, so they will not be repeated herein. However, a main difference between this wireless doorsill plate with changeable display information and power-saving mechanism and the aforementioned wireless doorsill plate with changeable display information and power-saving mechanism is that, the activation unit 3 is installed on an external electronic device 5. The external electronic device 5 can be a smart phone, a tablet computer, a smart watch, or other equivalent devices. The activation unit 3 further generates a display signal. The display module 14 receives the display signal and displays an information on the display module 14 according to the display signal. The information includes, but is not limited to, texts, graphics, and combinations thereof. Therefore, according to the structures of the present invention, users can easily use the external electronic device 5 to download and install applications, and after the display module 14 of the wireless doorsill plate with changeable display information and power-saving mechanism 1 receives the display signal, texts, graphics and even colors displayed by the display module 14 can be changed.

As mentioned above, the present invention has the following advantages compared to the prior art:

1. capable of achieving stable output of electric power and enabling the normal use of the battery module; and
2. capable of achieving power-saving efficacy.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. A wireless doorsill plate with changeable display information and power-saving mechanism including:
    a baseplate, a circuit board being provided on the baseplate;
    a battery module disposed on the baseplate and electrically connected to the circuit board, the battery module being used to generate an electric power;
    a radio frequency module disposed on the circuit board, the radio frequency module being used to receive an activation signal and generate a wireless signal;
    a display module correspondingly assembled on the circuit board, the display module having a backlight unit connected to the battery module; and
    an energy-saving module disposed on the circuit board and electrically connected to the battery module, according to the wireless signal the energy-saving module increasing the electric power generated by the battery module in order to turn on the backlight unit;
    wherein the energy-saving module generates a standby signal to allow the backlight unit entering a sleep mode after being turned on for a period of time, the radio frequency module, the display module, and the backlight unit enter a standby mode according to the standby signal, whereby an overall load of the wireless doorsill plate is controlled bellow a predetermined value by the energy-saving module;
    wherein the display module displays changeable display information.

2. The wireless doorsill plate with changeable display information and power-saving mechanism as claimed in claim 1, wherein an activation unit is further disposed on the baseplate, and the radio frequency module receives the activation signal generated by the activation unit.

3. The wireless doorsill plate with changeable display information and power-saving mechanism as claimed in claim 1, wherein an activation unit is installed on an external electronic device, and the external electronic device is selected from a group consisting of a smart phone, a tablet computer, and a smart watch.

4. The wireless doorsill plate with changeable display information and power-saving mechanism as claimed in claim 3, wherein the activation unit further generates a display signal, the display module receives the display signal and displays an information on the display module according to the display signal, and the information includes texts, graphics, and combinations thereof.

5. The wireless doorsill plate with changeable display information and power-saving mechanism as claimed in claim 4, wherein the backlight unit enters the sleep mode after being turned on for 30 seconds.

6. The wireless doorsill plate with changeable display information and power-saving mechanism as claimed in claim 1, wherein a wireless transceiver module is further connected to the energy-saving module, the energy-saving module receives a wireless communication signal from the wireless transceiver module so that the energy-saving module turns on the display module and increases a brightness of the backlight unit.

7. The wireless doorsill plate with changeable display information and power-saving mechanism as claimed in claim 1, wherein the battery module is a button cell battery.

8. The wireless doorsill plate with changeable display information and power-saving mechanism as claimed in claim 1, wherein the display module is selected from a group consisting of a light-emitting diode panel, an organic light-emitting diode panel, a liquid crystal display panel, and an electronic paper panel.

* * * * *